March 11, 1958 T. HEIL 2,826,210
TRAILER TENT FRAME
Filed Aug. 8, 1955 2 Sheets-Sheet 1
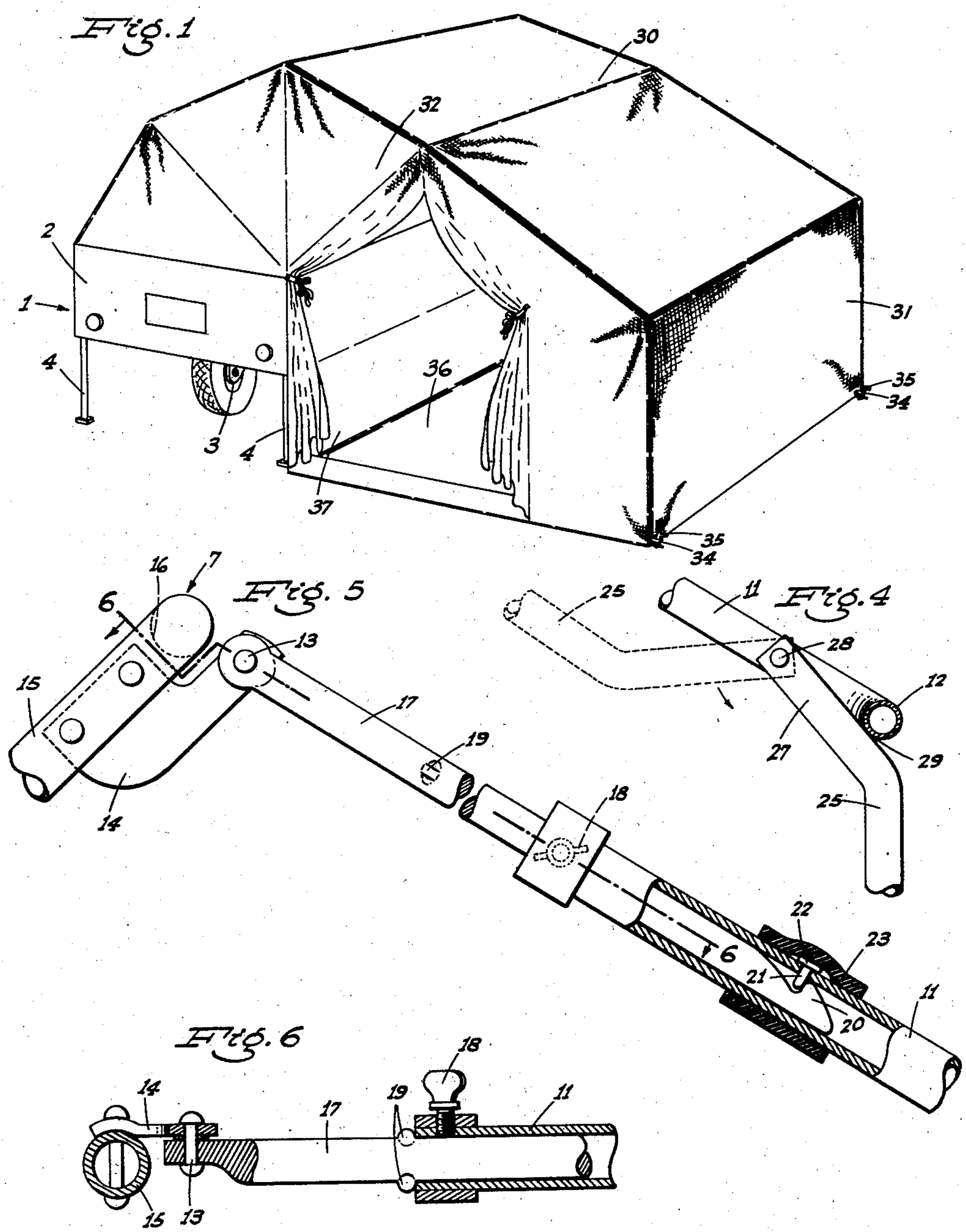
INVENTOR
Theodore Heil
BY Webster & Webster
ATTYS.

TRAILER TENT FRAME
Filed Aug. 8, 1955
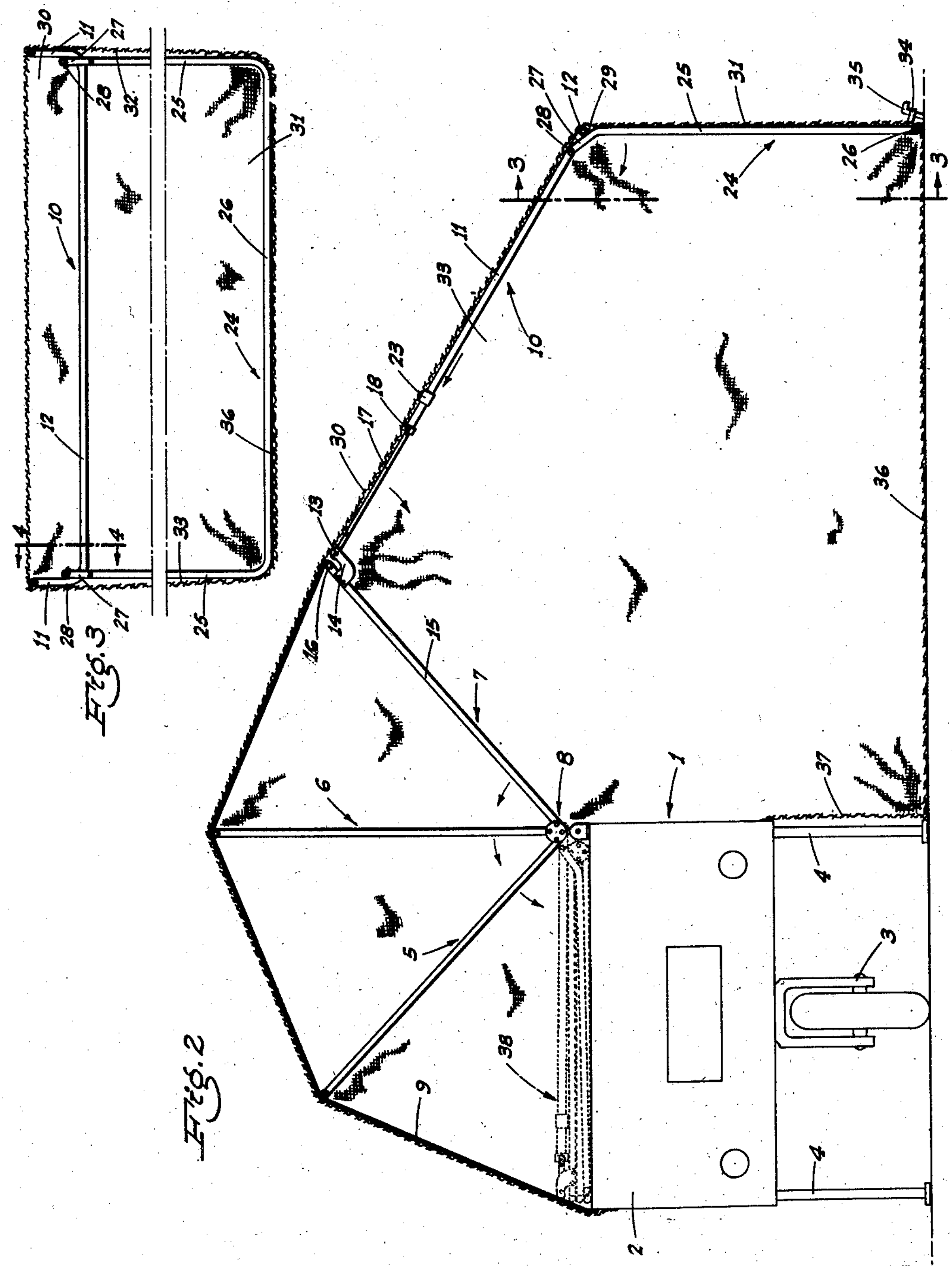
INVENTOR
Theodore Heil
BY Webster & Webster
ATTYS.

United States Patent Office 2,826,210

Patented Mar. 11, 1958

1

2,826,210

TRAILER TENT FRAME

Theodore Heil, Lodi, Calif., assignor to Heilite Trailers, Lodi, Calif., a limited partnership Application August 8, 1955, Serial No. 526,897

2 Claims. (Cl. 135—4)

This invention relates in general to an improvement in camp tents of the type which include a foldable frame arranged in connection with a vehicle trailer; the frame—together with the attached tent cover—when folded, resting flat on top of the body of the trailer for transport, and when erected providing the support for the tent cover which then not only encompasses such body from above, but extends laterally to form an enclosure—from the ground upward—alongside the trailer.

In particular the present invention represents an improvement in the trailer tent shown in my United States Letters Patent No. 2,513,411, dated July 4, 1950.

It is the major object of the present invention to provide a foldable frame, for a trailer tent of the type described, which—when erected—extends in a lateral direction a substantially greater distance from the body of the trailer than in the embodiment of my above identified patent, whereby the frame supported tent cover can be correspondingly increased in width to thus form a larger and more convenient enclosure alongside the trailer.

Another important object of this invention is to provide a foldable tent frame, as above, which is arranged so that—when erected—the outermost portion of said frame is supported directly from the ground, so as to insure stability of the erected tent and to prevent sagging or wrinkling of the cover.

An additional object of the invention is to provide a foldable frame, as in the preceding paragraph, which includes a novel extension bow adapted to top-support the main part of the cover which forms the enclosure alongside the trailer; the extension bow—when in use—having a reach greater than the width of the trailer, but being adjustable so that such reach may be reduced to an extent that said extension bow may fold, with the remainder of the frame, onto the body of the trailer without projection therefrom.

It is also an object of the invention to provide a foldable frame for a trailer tent which is designed for ease and economy of manufacture, and convenience of erection; the frame being light weight but sturdy.

Still another object of the invention is to provide a practical and reliable foldable frame, for a trailer tent, and yet one which will be exceedingly effective for the purpose for which it is designed.

These objects are accomplished by means of such structure and relative arrangement of parts as will fully appear by a perusal of the following specification and claims.

In the drawings:

Fig. 1 is a perspective view showing a trailer tent, embodying the present invention, as erected for use.

Fig. 2 is a side to side sectional elevation of the same, except for the trailer.

Fig. 3 is a transverse sectional elevation, foreshortened, taken on line 3—3 of Fig. 2.

Fig. 4 is an enlarged fragmentary cross section taken on line 4—4 of Fig. 3, but with the adjacent portion of the tent cover omitted.

2

Fig. 5 is an enlarged fragmentary elevation, foreshortened, showing one of the adjustable legs of the extension bow; such leg being illustrated in the position occupied thereby when the frame is erected.

Fig. 6 is a fragmentary, longitudinal sectional view taken on line 6—6 of Fig. 5.

Referring now more particularly to the drawings, and to the characters of reference marked thereon, the present invention is embodied in a camp tent of the type—as shown in my hereinbefore identified patent—which is mounted in connection with a trailer, indicated generally at 1; the trailer including a box-like body 2, a supporting wheel unit 3, and corner legs 4 which stabilize the body 2 from the ground when the tent is in use. The legs 4 may be foldable against the bottom of the body 2 for transport, or removably mounted, as desired.

The foldable tent frame includes—by reference to its erected position—a laterally inwardly extending, upwardly inclined bow 5, a vertical intermediate bow 6, and a laterally outwardly extending, upwardly inclined bow 7; the bows 5, 6, and 7 being disposed at their lower free ends in adjacent relation immediately above one of the upper longitudinal edges of the box-like body 2. At such ends the bows 5, 6, and 7 are connected to the body 2 by pivotal attachment units, one of which is indicated generally at 8, and by means of which units said bows may be folded together and downwardly onto the top of the body 2.

In their erected positions, as in Fig. 2, the bows 5, 6, and 7 are maintained properly spaced by spanning tie straps, one of which is indicated at 9, which are not only secured to said bows but extend to and are connected with the body 2 at the upper longitudinal edge thereof opposite the attachment units 8. To this extent the frame of the trailer tent is substantially the same as in my said prior patent, but otherwise such frame is materially improved, by reason of the following structure:

An extension bow, indicated generally at 10, extends laterally outwardly and at a downward incline from immediately adjacent the outer corners of the bow 7; such extension bow including end legs 11 and an outer cross bar 12. The free ends of the legs 11 are pivotally connected, as at 13, to brackets 14 fixed on the end legs 15 of the bow 7 immediately adjacent the top cross bar 16 thereof.

The brackets 14, which are dog-leg or substantially L-shaped, are mounted so that the pivots 13 lie close to but outwardly of the top cross bar 16, and whereby the extension bow 10—when adjusted, as will hereinafter appear, to reduce its effective reach—may fold substantially flat against said bow 7.

The end legs 11 of the extension bow 10 are telescopic, each including—at the end portion adjacent the brackets 14—a rod 17 which slidably engages in the remainder of the leg, and which rod is normally in locked-up position by means of a finger screw 18 threaded through the adjacent end portion of said remainder of the leg.

The extent to which each of the end legs 11 can be adjusted to decrease its effective length is limited by stops 19 on the rod 17.

When the finger screw 18 of each of the adjustable end legs 11 is released and said leg is adjusted to increase its effective length, the following means is provided to assure against over-adjustment and withdrawal of the rod 17:

The rod 17 of each adjustable end leg 11 is formed—near its free end, and which is the end within the remainder of the leg—with a hook 20 into which a stop pin 21 is adapted to drop at the desired limit.

The stop pin 21 is externally headed, as at 22, and thence projects through a hole in the leg; there being a sleeve 23 of resilient material surrounding said leg in engagement with the pin head 22. Such sleeve therefore yieldably urges the stop pin 21 inwardly, for the purpose of assuring its engagement in the hook 20 when the rod 17 is adjusted—to maximum—to increase the effective length of the leg 11; but to yield when said rod is adjusted in the opposite direction; i. e., to decrease the effective length of said leg 11.

The extension bow 10 is supported, at its outboard end, from the ground by a vertical bow 24 which includes upstanding end legs 25 and a bottom cross bar 26. The upper portion of each of the upstanding end legs 25 is formed with a tip 27 which extends at an upward and inward incline to pivotal connection, as at 28, with the related end leg 11 adjacent but short of said outer cross bar 12; said tips lying to the inside of said legs.

When the supporting bow 24 is in its vertical position of use the tips 27 abut the outer cross bar 12, as at 29, whereby to automatically position said bow 24 when it is swung from a folded position, as in dotted lines in Fig. 4, to the full-line position shown therein. When the supporting bow 24 is in its folded position it lies closely adjacent and parallel to the extension bow 10.

The described foldable frame of the trailer tent is encompassed by, and supports, a tent cover of fabric which includes—generally—a top panel 30, an outer side wall 31, and end walls 32 and 33. The top panel 30 and the end walls 32 and 33 are secured at their lower margins to the related side and ends of the body 2 of the trailer. The end wall 32, in the portion of the tent laterally of the body 2 of the trailer, is formed with a door, as shown.

The outer side wall 31 includes, at its lower corner, rings or loops 34 through which ground stakes 35 are driven, whereby to tension said outer side wall and to maintain the corresponding corners of the tent in place.

Additionally, the tent includes a fabric floor 36 which extends, in integral relation, from the lower edge of the outer side wall 31 to a point adjacent the trailer; said floor turning upwardly, to provide a closure skirt 37, and being secured by suitable means to the adjacent side of the body 2 of the trailer.

By reason of the inclusion in the described frame, of the extension bow 10, the enclosure provided by the tent laterally of the body 2, or alongside the trailer, is of substantially greater width than could be obtained by the arrangement shown in my said prior patent, and additionally the supporting bow 24 affords greater stability and durability of said frame, with sagging or wrinkling of the cover being minimized.

With such relatively large enclosure alongside the trailer, occupancy is much more convenient, and the enclosure is sufficiently large to receive a bed, chairs, and other camping accessories.

When it is desired to strike the tent the stakes 35 are pulled and the end legs 11 of the extension bow 10 are adjusted to reduce the reach of said bow; the latter as so adjusted then being substantially the length of the adjacent bow 7. Thereafter, the supporting bow 24, which has a reach substantially that of the bow 7, is swung laterally inwardly and upwardly until it lies close to, and in substantial parallelism with, said extension bow 10.

Next, the folded-together supporting bow 24 and extension bow 10 are swung laterally inwardly about the pivot 13 until they lie closely adjacent and substantially parallel to the bow 7.

The final manipulation—in the folding of the frame—is to swing the already folded bow 24, bow 10, and bow 7, in the direction of the trailer, which folds said bows against the bows 6 and 5, and all thereof into a completely folded or collapsed compact assembly, indicated generally at 38, and as shown in dotted lines in Fig. 2, resting on top of the body 2 of the trailer 1.

The cover of the tent is of course also folded in association with the assembly 38, and for transport said assembly and the folded cover is preferably enclosed within a snap-on hood (not shown).

With the described trailer tent frame it may be readily erected, or struck, with a minimum of effort, and in a short time, yet providing the very substantial advantages hereinbefore set forth.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A foldable tent frame comprising, with an above-ground support, a bow unit foldably mounted at its lower end on the support and including a bow which, when the frame is unfolded, extends at an upward and outward incline from the support, a second bow extending outwardly from the upper end of the first named bow, means pivoting the second bow at its inner end to the upper end of the first named bow for folding thereagainst, a third bow extending downwardly from the outer end of the second bow, the second bow including transversely spaced legs and a cross bar connecting the same at their outer ends, the third bow having corresponding legs formed with inwardly and upwardly inclined tips, and means pivoting said tips at their upper ends to the legs of the second bow adjacent but short of the cross bar whereby the third bow is foldable against the under side of the second bow; said tips being in a position such that the same abut the cross bar as a stop when the third bow is in a substantially vertical, unfolded position.

2. In a foldable tent frame which includes, with an above-ground support, a foldable bow unit pivoted in connection with the support and including a plurality of equal length bows one of which when the unit is unfolded inclines upwardly and outwardly from the support; an extension bow extending, when in an operative position, outwardly from the upper end of said one bow, a supporting bow extending, when in operative position, downwardly from the outer end of the extension bow to the ground, means horizontally pivoting the supporting bow at its upper end to the outer end of the extension bow for folding against the under side of said extension bow, and means horizontally pivoting the extension bow at its inner end on the outer end of said one bow for folding against the downwardly facing side of the latter; said extension bow being as long as said one bow whereby the outer surface of a portion of a tent cover mounted on the frame and connected to the bows, will cover the bow unit from above when the frame is completely folded.

References Cited in the file of this patent

UNITED STATES PATENTS

| | | |
|---|---|---|
| 1,185,981 | Campbell | June 6, 1916 |
| 1,483,741 | Moffett | Feb. 12, 1924 |
| 1,707,960 | Gilkison | Apr. 2, 1929 |
| 2,459,026 | Hardy | Jan. 11, 1949 |
| 2,513,411 | Heil | July 4, 1950 |
| 2,530,765 | Greenup | Nov. 21, 1950 |

FOREIGN PATENTS

| | | |
|---|---|---|
| 513,613 | Canada | June 14, 1955 |

OTHER REFERENCES

Popular Science Magazine, June 1955, page 167.